US012711340B2

(12) United States Patent
West et al.

(10) Patent No.: US 12,711,340 B2
(45) **Date of Patent: *Aug. 18, 2026**

(54) SYSTEMS AND METHODS TO OPTIMIZE IMAGING SETTINGS AND IMAGE CAPTURE FOR A MACHINE VISION JOB

(71) Applicant: Zebra Technologies Corporation, Lincolnshire, IL (US)

(72) Inventors: Christopher M. West, South Setauket, NY (US); Usha Prasad, Shoreham, NY (US); Matthew Lawrence Horner, Sound Beach, NY (US); James Matthew Witherspoon, Howell, MI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/045,497

(22) Filed: Feb. 4, 2025

(65) Prior Publication Data

US 2025/0181861 A1 Jun. 5, 2025

Related U.S. Application Data

(63) Continuation of application No. 18/387,448, filed on Nov. 6, 2023, now Pat. No. 12,217,126, which is a continuation of application No. 17/395,702, filed on Aug. 6, 2021, now Pat. No. 11,809,949.

(60) Provisional application No. 63/182,435, filed on Apr. 30, 2021.

(51) Int. Cl.

| | |
|---|---|
| ***G06K 7/14*** | (2006.01) |
| ***B25J 9/16*** | (2006.01) |
| ***G06K 7/10*** | (2006.01) |
| ***G06K 19/06*** | (2006.01) |

(52) U.S. Cl.

CPC ..... *G06K 7/1417* (2013.01); *G06K 19/06037* (2013.01); *B25J 9/1697* (2013.01); *G06K 7/10732* (2013.01)

(58) Field of Classification Search

CPC ............ G06K 7/1417; G06K 7/10732; G06K 19/06037; B25J 9/1697

See application file for complete search history.

(56) References Cited

U.S. PATENT DOCUMENTS

| | | | | |
|---|---|---|---|---|
| 2004/0118922 A1* | 6/2004 | Murata | G06K 7/1417 | 235/454 |
| 2016/0104021 A1* | 4/2016 | Negro | G06K 7/1465 | 235/462.08 |
| 2018/0239938 A1* | 8/2018 | Nagata | G06K 7/10752 | |

* cited by examiner

*Primary Examiner* — Laura A Gudorf

(57) ABSTRACT

Techniques for optimizing one or more imaging settings for a machine vision job are provided. An example method includes configuring a machine vision job by setting a plurality of banks of imaging parameters, with each of the plurality of banks of imaging parameters being different from each other; transmitting the machine vision job to an imaging device; and executing the machine vision job on the imaging device to: (a) capture an image with the imaging device operating pursuant to one of the plurality of banks of imaging parameters; (b) attempt to decode a barcode within the image; (c) responsive to successfully decoding the barcode within the image, successfully ending the barcode reader tool; and (d) responsive to unsuccessfully decoding the barcode within the image, repeating (a)-(d) with another one of the one of the plurality of banks of imaging parameters.

17 Claims, 9 Drawing Sheets

FIG. 4

SYSTEMS AND METHODS TO OPTIMIZE IMAGING SETTINGS AND IMAGE CAPTURE FOR A MACHINE VISION JOB

CROSS-REFERENCE TO RELATED APPLICATIONS

This application is a continuation of U.S. patent application Ser. No. 18/387,448, filed on Nov. 6, 2021, which is a continuation of U.S. patent application Ser. No. 17/395,702, filed on Aug. 6, 2021, which claims priority from provisional U.S. Patent Application Ser. No. 63/182,435, filed on Apr. 30, 2021, the entirety of which are incorporated herein by reference.

BACKGROUND

Over the years, industrial automation has come to rely heavily on machine vision components capable of assisting operators in a wide variety of tasks. In some implementations, machine vision components, like cameras, are utilized to track objects passing objects, like those which move on conveyor belts past stationary cameras. Often these cameras, along with the backend software, are used to capture a variety of parameters associated with the passing items. To do this, the software is configured with a job which includes a series of tools that are executing during each job execution. Subsequently, as items (e.g., boxes) pass within the field of view (FOV) of the camera, a job is executed for each such item.

While in theory such a setup should be capable of capturing whatever information is sought from every job, in practice, flawless execution is often not achieved. This can happen due to the fact that item characteristics (e.g., shape, size, position, color, quality of markings, etc.) can often vary between items. Consequently, setting up a single set of imaging parameters for the camera, despite working for some jobs, is not guaranteed to capture images of sufficient quality in all cases. In other words, while a preconfigured set of parameters may cause a job to be executed flawlessly for package A, those parameters may result in images/video that are insufficient to execute the job for package B. This issue is compounded further by the fact that jobs are typically configured to terminate upon a failure of one of the tools within the job. Thus, if, for example, a job includes tool (a) to read a barcode attached to the item, tool (b) to identify the dimensions of the item, and tool (c) to identify a defect within the item, and upon the execution of the job the images captured by the camera are of insufficient quality for the software to decode the barcode (i.e., to successfully execute tool (a)), the entire job is cancelled and neither tool (b) nor tool (c) is executed. To combat this issue, industrial venue operators are often forced to install a plethora of imaging devices along the path of an item in hopes of at least one of those devices being able to capture images of sufficient quality to execute a job even if the images from a preceding device are of insufficient quality. This, however, adds tremendous complexity, cost, and increases instances of potential failure due to the increase in the number of devices in operation.

Thus, there is a need for improved systems, methods, and devices directed towards successful job execution within the industrial machine vision space.

SUMMARY

In an embodiment, the present invention is a method for operating a fixed industrial scanner system, the fixed industrial scanner system including a computing device executing an application and an imaging device communicatively coupled to the computing device, the method comprising: configuring, via the application, a machine vision job, the configuring the machine vision job including configuring a barcode reading tool, the configuring the barcode reading tool including setting a plurality of banks of imaging parameters, each of the plurality of banks of imaging parameters being different from each other of the plurality of banks of imaging parameters; transmitting, from the computing device to the imaging device, the machine vision job; and executing the machine vision job on the imaging device, wherein, during an execution of the barcode reading tool, the machine vision job causes the imaging device to: capture an image with the imaging device operating pursuant to one of the plurality of banks of imaging parameters; attempt to decode a barcode within the image; responsive to successfully decoding the barcode within the image, successfully ending the barcode reader tool; and responsive to unsuccessfully decoding the barcode within the image, repeating (a)-(d) with another one of the one of the plurality of banks of imaging parameters.

In a variation of this embodiment, the executing the machine vision job on the imaging device is performed for each target appearing within a field of view of the imaging device.

Additionally, in a variation of this embodiment, the plurality of banks of imaging parameters includes three banks of imaging parameters.

Furthermore, in a variation of this embodiment, the imaging device is stationary and wherein the barcode appears on a target moving past the imaging device at a substantially constant speed.

Moreover, in a variation of this embodiment, the machine vision job includes at least one other tool having only a single bank of imaging parameters.

Additionally, in a variation of this embodiment, the imaging parameters include at least one of: a lighting parameter, an exposure parameters, or a focus parameter.

Furthermore, in a variation of this embodiment, executing the machine vision job on the imaging device further causes the imaging device to: responsive to successfully decoding the barcode within the image, store an indication of the one of the plurality of banks of imaging parameters associated with successfully decoding the barcode within the image; and executing a subsequent machine vision job on the imaging device causes the imaging device to first capture a subsequent image with the imaging device operating pursuant to the stored one of the plurality of banks of imaging parameters.

Moreover, in a variation of this embodiment, successfully decoding the barcode within the image includes decoding the barcode with a barcode quality metric (BQM) greater than a threshold BQM, and wherein unsuccessfully decoding the barcode within the image includes decoding the barcode with a BQM below the threshold BQM.

In another embodiment, the present invention is a method for operating a fixed industrial scanner system, the fixed industrial scanner system including a computing device executing an application and an imaging device communicatively coupled to the computing device, the method comprising: configuring, via the application, a machine vision job, the configuring the machine vision job including configuring a barcode reading tool, the configuring the barcode reading tool including setting a plurality of banks of imaging parameters, each of the plurality of banks of imaging parameters being different from each other of the plurality of banks of imaging parameters; transmitting, from the computing device to the imaging device, the machine vision job; and executing the machine vision job on the imaging device, wherein, during an execution of the barcode reading tool, the machine vision job causes the imaging device to: capture a plurality of images with the imaging device operating pursuant to one of the plurality of banks of imaging parameters for capturing each of the plurality of images; attempt to decode a barcode within one of the plurality of images; responsive to successfully decoding the barcode within the one of the plurality of images, successfully ending the barcode reader tool; and responsive to unsuccessfully decoding the barcode within the one of the plurality of images, repeating (b)-(d) with another one of the plurality of images.

In a variation of this embodiment, the executing the machine vision job on the imaging device is performed for each target appearing within a field of view of the imaging device.

Additionally, in a variation of this embodiment, the plurality of banks of imaging parameters includes three banks of imaging parameters.

Furthermore, in a variation of this embodiment, the imaging device is stationary and wherein the barcode appears on a target moving past the imaging device at a substantially constant speed.

Moreover, in a variation of this embodiment, the machine vision job includes at least one other tool having only a single bank of imaging parameters.

Additionally, in a variation of this embodiment, the imaging parameters include at least one of: a lighting parameter, an exposure parameters, or a focus parameter.

Furthermore, in a variation of this embodiment, executing the machine vision job on the imaging device further causes the imaging device to: responsive to successfully decoding the barcode within one of the plurality of images, store an indication of the one of the plurality of banks of imaging parameters associated with successfully decoding the barcode within the image; and executing a subsequent machine vision job on the imaging device causes the imaging device to first attempt to decode a barcode in a subsequent image captured by the imaging device operating pursuant to the stored one of the plurality of banks of imaging parameters.

Moreover, in a variation of this embodiment, successfully decoding the barcode within one of the plurality of images includes decoding the barcode within one of the plurality of images with a barcode quality metric (BOM) greater than a threshold BQM, and wherein unsuccessfully decoding the barcode within the within one of the plurality of images includes decoding the barcode within one of the plurality of images with a BQM below the threshold BQM.

In yet another embodiment, the present invention is a fixed industrial scanner system comprising: a computing device executing an application, the application operable to configure a machine vision job having a barcode reading tool, wherein the barcode reading tool includes a selection of a plurality of banks of imaging parameters, each of the plurality of banks of imaging parameters being different from each other of the plurality of banks of imaging parameters; and an imaging device configured to execute the machine vision job such that the, during an execution of the barcode reading tool, the machine vision job causes the imaging device to: capture an image with the imaging device operating pursuant to one of the plurality of banks of imaging parameters; attempt to decode a barcode within the image; responsive to successfully decoding the barcode within the image, successfully ending the barcode reader tool; and responsive to unsuccessfully decoding the barcode within the image, repeating (a)-(d) with another one of the one of the plurality of banks of imaging parameters.

In a variation of this embodiment, the executing the machine vision job on the imaging device is performed for each target appearing within a field of view of the imaging device.

Additionally, in a variation of this embodiment, the plurality of banks of imaging parameters includes three banks of imaging parameters.

Furthermore, in a variation of this embodiment, the imaging device is stationary and wherein the barcode appears on a target moving past the imaging device at a substantially constant speed.

Moreover, in a variation of this embodiment, the machine vision job includes at least one other tool having only a single bank of imaging parameters.

Additionally, in a variation of this embodiment, the imaging parameters include at least one of: a lighting parameter, an exposure parameters, or a focus parameter.

Furthermore, in a variation of this embodiment, executing the machine vision job further causes the imaging device to: responsive to successfully decoding the barcode within the image, store an indication of the one of the plurality of banks of imaging parameters associated with successfully decoding the barcode within the image; and executing a subsequent machine vision job on the imaging device causes the imaging device to first capture a subsequent image with the imaging device operating pursuant to the stored one of the plurality of banks of imaging parameters.

Moreover, in a variation of this embodiment, successfully decoding the barcode within the image includes decoding the barcode with a barcode quality metric (BQM) greater than a threshold BQM, and wherein unsuccessfully decoding the barcode within the image includes decoding the barcode with a BQM below the threshold BQM.

In still yet another embodiment, the present application is a fixed industrial scanner system comprising: a computing device executing an application, the application operable to configure a machine vision job having a barcode reading tool, wherein the barcode reading tool includes a selection of a plurality of banks of imaging parameters, each of the plurality of banks of imaging parameters being different from each other of the plurality of banks of imaging parameters; and an imaging device configured to execute the machine vision job such that the, during an execution of the barcode reading tool, the machine vision job causes the imaging device to: capture a plurality of images with the imaging device operating pursuant to one of the plurality of banks of imaging parameters for capturing each of the plurality of images; attempt to decode a barcode within one of the plurality of images; responsive to successfully decoding the barcode within the one of the plurality of images, successfully ending the barcode reader tool; and responsive to unsuccessfully decoding the barcode within the one of the plurality of images, repeating (b)-(d) with another one of the plurality of images.

In a variation of this embodiment, the executing the machine vision job on the imaging device is performed for each target appearing within a field of view of the imaging device.

Additionally, in a variation of this embodiment, the plurality of banks of imaging parameters includes three banks of imaging parameters.

Furthermore, in a variation of this embodiment, the imaging device is stationary and wherein the barcode appears on a target moving past the imaging device at a substantially constant speed.

Moreover, in a variation of this embodiment, the machine vision job includes at least one other tool having only a single bank of imaging parameters.

Additionally, in a variation of this embodiment, the imaging parameters include at least one of: a lighting parameter, an exposure parameters, or a focus parameter.

Furthermore, in a variation of this embodiment, executing the machine vision job further causes the imaging device to: responsive to successfully decoding the barcode within one of the plurality of images, store an indication of the one of the plurality of banks of imaging parameters associated with successfully decoding the barcode within the image; and executing a subsequent machine vision job on the imaging device causes the imaging device to first attempt to decode a barcode in a subsequent image captured by the imaging device operating pursuant to the stored one of the plurality of banks of imaging parameters.

Moreover, in a variation of this embodiment, successfully decoding the barcode within one of the plurality of images includes decoding the barcode within one of the plurality of images with a barcode quality metric (BQM) greater than a threshold BQM, and wherein unsuccessfully decoding the barcode within the within one of the plurality of images includes decoding the barcode within one of the plurality of images with a BQM below the threshold BQM.

In another embodiment, the present application is a method for operating a fixed industrial scanner system, the fixed industrial scanner system including a computing device executing an application and an imaging device communicatively coupled to the computing device, the method comprising: configuring, via the application, a machine vision job, the configuring the machine vision job including configuring a barcode reading tool, the configuring the barcode reading tool including setting a plurality of banks of imaging parameters, each of the plurality of banks of imaging parameters being different from each other of the plurality of banks of imaging parameters; transmitting, from the computing device to the imaging device, the machine vision job; and executing the machine vision job on the imaging device, wherein, during an execution of the barcode reading tool, the machine vision job causes the imaging device to: capture an image with the imaging device operating pursuant to one of the plurality of banks of imaging parameters; attempt to decode a barcode within the image; responsive to successfully decoding the barcode within the image, measure a barcode quality metric (BQM) associated with the decoded barcode; repeat (a)-(c) with another each of the plurality of banks of imaging parameters; and store the image of the decoded barcode associated with the highest BQM.

In yet another embodiment, the present application is a method for operating a fixed industrial scanner system, the fixed industrial scanner system including a computing device executing an application and an imaging device communicatively coupled to the computing device, the method comprising: configuring, via the application, a machine vision job, the configuring the machine vision job including configuring a barcode reading tool, the configuring the barcode reading tool including setting a plurality of banks of imaging parameters, each of the plurality of banks of imaging parameters being different from each other of the plurality of banks of imaging parameters; transmitting, from the computing device to the imaging device, the machine vision job; and executing the machine vision job on the imaging device, wherein, during an execution of the barcode reading tool, the machine vision job causes the imaging device to: capture a plurality of images with the imaging device operating pursuant to one of the plurality of banks of imaging parameters for capturing each of the plurality of images; attempt to decode a barcode within one of the plurality of images; responsive to successfully decoding the barcode within the image, measure a barcode quality metric (BQM) associated with the decoded barcode; repeat (b)-(c) with another one of the plurality of images; and store the image of the decoded barcode associated with the highest BQM.

In still yet another embodiment, the present application is a fixed industrial scanner system comprising: a computing device executing an application, the application operable to configure a machine vision job having a barcode reading tool, wherein the barcode reading tool includes a selection of a plurality of banks of imaging parameters, each of the plurality of banks of imaging parameters being different from each other of the plurality of banks of imaging parameters; and an imaging device configured to execute the machine vision job such that the, during an execution of the barcode reading tool, the machine vision job causes the imaging device to: capture an image with the imaging device operating pursuant to one of the plurality of banks of imaging parameters; attempt to decode a barcode within the image; responsive to successfully decoding the barcode within the image, measure a barcode quality metric (BQM) associated with the decoded barcode; repeat (a)-(c) with another each of the plurality of banks of imaging parameters; and store the image of the decoded barcode associated with the highest BQM.

In another embodiment, the present application is a fixed industrial scanner system comprising: a computing device executing an application, the application operable to configure a machine vision job having a barcode reading tool, wherein the barcode reading tool includes a selection of a plurality of banks of imaging parameters, each of the plurality of banks of imaging parameters being different from each other of the plurality of banks of imaging parameters; and an imaging device configured to execute the machine vision job such that the, during an execution of the barcode reading tool, the machine vision job causes the imaging device to: capture a plurality of images with the imaging device operating pursuant to one of the plurality of banks of imaging parameters for capturing each of the plurality of images; attempt to decode a barcode within one of the plurality of images; responsive to successfully decoding the barcode within the image, measure a barcode quality metric (BQM) associated with the decoded barcode; repeat (b)-(c) with another one of the plurality of images; and store the image of the decoded barcode associated with the highest BQM.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 depicts an example of a barcode decode tool being configured as part of a job, in accordance with embodiments described herein.

Figure 1:
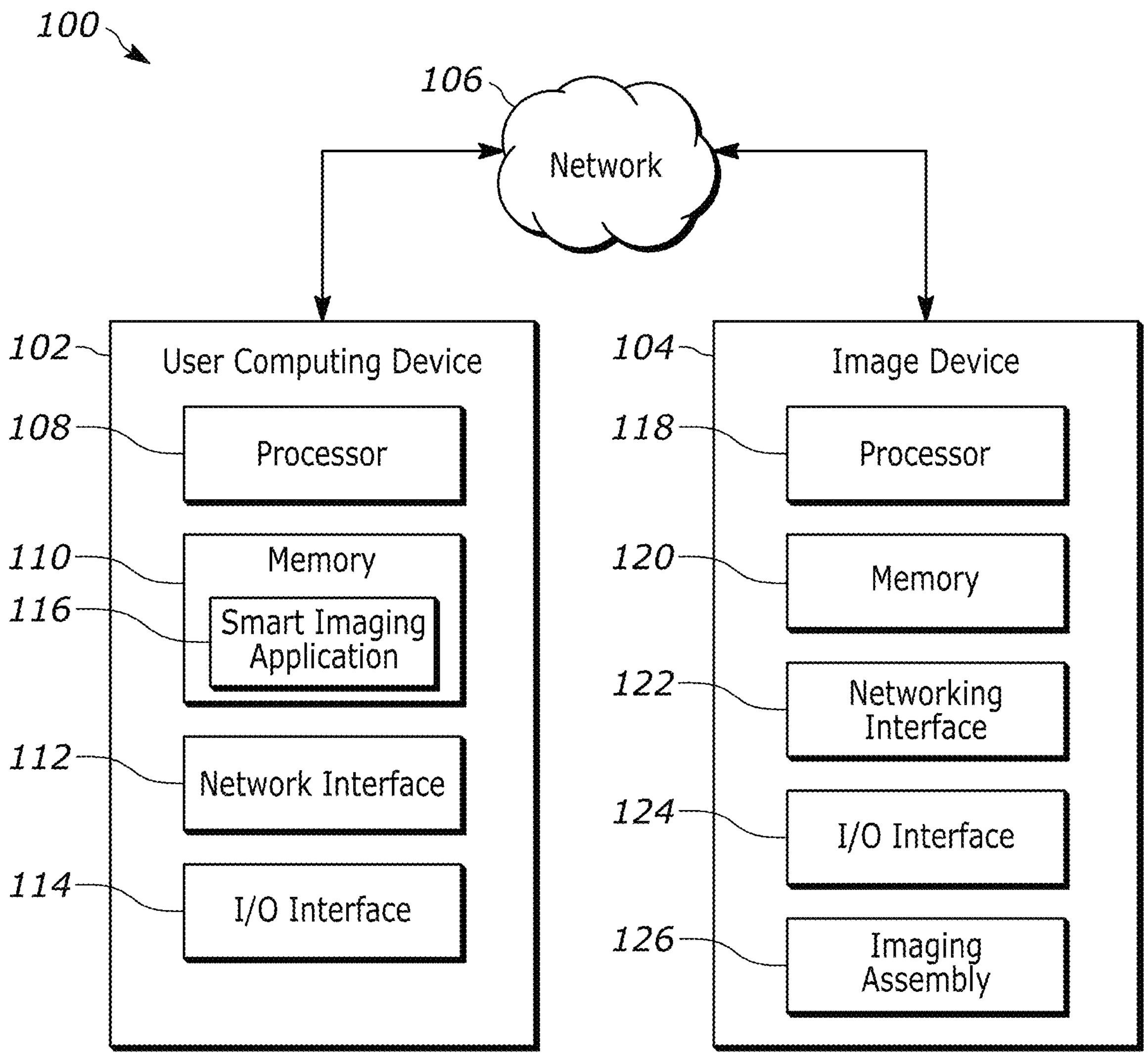
FIG. 1 is an example system for optimizing one or more imaging settings for a machine vision job, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Fixed industrial scanner system owners/operators have conventionally been plagued with being unable to achieve high fidelity image analysis using multiple imaging settings without purchasing and installing additional system components. Cameras, readers, external lights, and other components can be very costly to purchase and install, and generally reduce system efficiency by requiring users/operators to individually change component settings between image captures to ensure each image is suitable for a particular machine vision technique. Thus, it is an objective of the present disclosure to reduce or eliminate these and other problems with conventional machine vision systems by enabling the creation and execution of machine vision jobs designed to address the issues noted above. As described herein, the embodiments of the present disclosure may reduce the need for costly additional components, speed up the installation and integration time for a machine vision system, and ensure that the system maximizes image capture and processing efficiency. As used herein, a "machine vision job" or a "machine vision technique" can refer to any type of image analysis, including, e.g., reading barcodes, determining contrast, determining pixel counts, edge detection, etc.

In particular, with image captures using single set of imaging parameters for barcode decode tools, which is how most tools are run within a machine vision job today, there is only one burst of image captures, all using the same set of imaging parameters, in which a decode may be attempted. However, in many installations, a barcode subject can be in motion, either as the result of human interaction or a moving conveyer belt, which does not allow the machine vision job time to attempt another capture and subsequent job run on that same subject using a different set of imaging parameters before the object exits the field of view of the imaging device. Users need a way to capture images using different sets of imaging parameters, ahead of a job run, for use to cycle through the captures, and perform a barcode decode on each image, using different capture settings, until a successful decode is obtained.

In various examples, the techniques disclosed herein provide users with the ability to select one or many banks when setting up the tool within a job. On a separate configuration panel, users may configure imager setups, known as banks, for various light, exposure, ands focus settings, as needed. This collection of pre-configured banks may direct the machine vision job running on the imaging device to capture an image of the subject (the barcode situated in front of the imaging device) using each bank. That is, if three banks are configured on a barcode decode tool, the imaging device may capture at least three images, i.e., at least one image for each bank. The machine vision job may cycle through the collection of images and attempt to perform a barcode decode on each image until a barcode is successfully decoded in one of the images. For instance, if a user configures three banks, the imaging device may capture three images immediately (i.e., in a "burst" of images). Consequently, even if the machine vision job (i.e., a barcode reading tool of the machine vision job) fails to decode a barcode in the first of the three images, the machine vision job will attempt to decode a barcode in the second of the three images, and then the third of the three images. Once the machine vision job successfully decodes a barcode in one of the images, the machine vision job may ignore the remaining captures and move on to the next tool in the machine vision job, or to the next machine vision job. That is, if the machine vision job successfully decodes a barcode in, for example, the second of the three images the machine vision job will not proceed to attempt to decode a barcode in the third of the three images.

Figure 6:
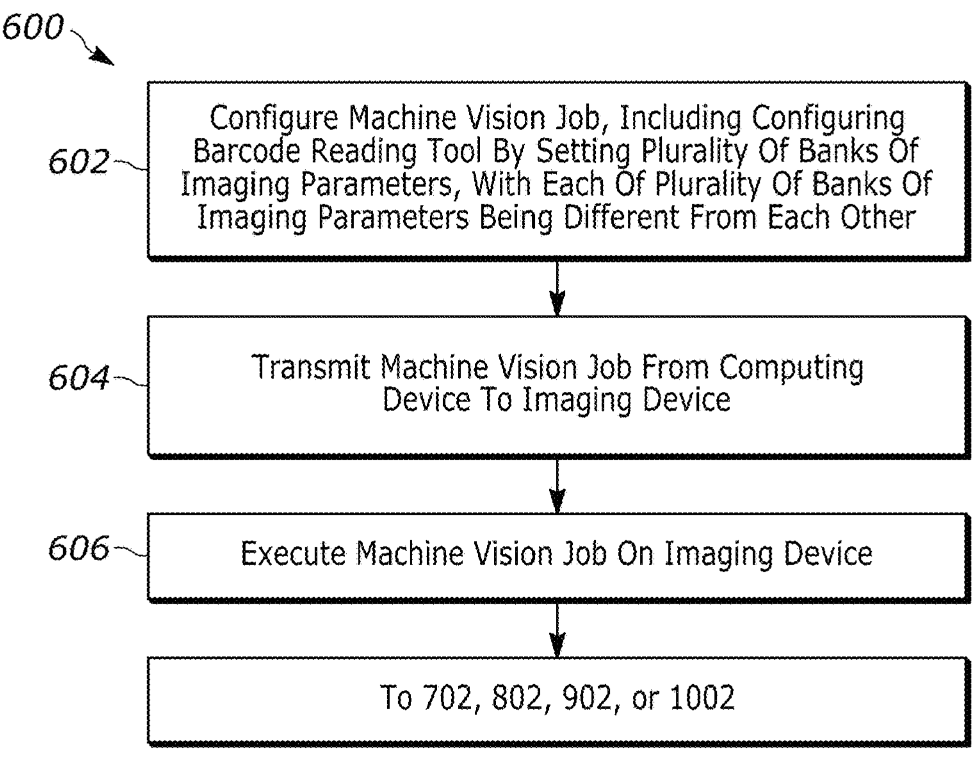
FIG. 6 depicts a flow diagram of an example method as may be implemented by the system of FIG. 1, for optimizing one or more imaging settings for a machine vision job, in accordance with embodiments described herein.
Figure 7:
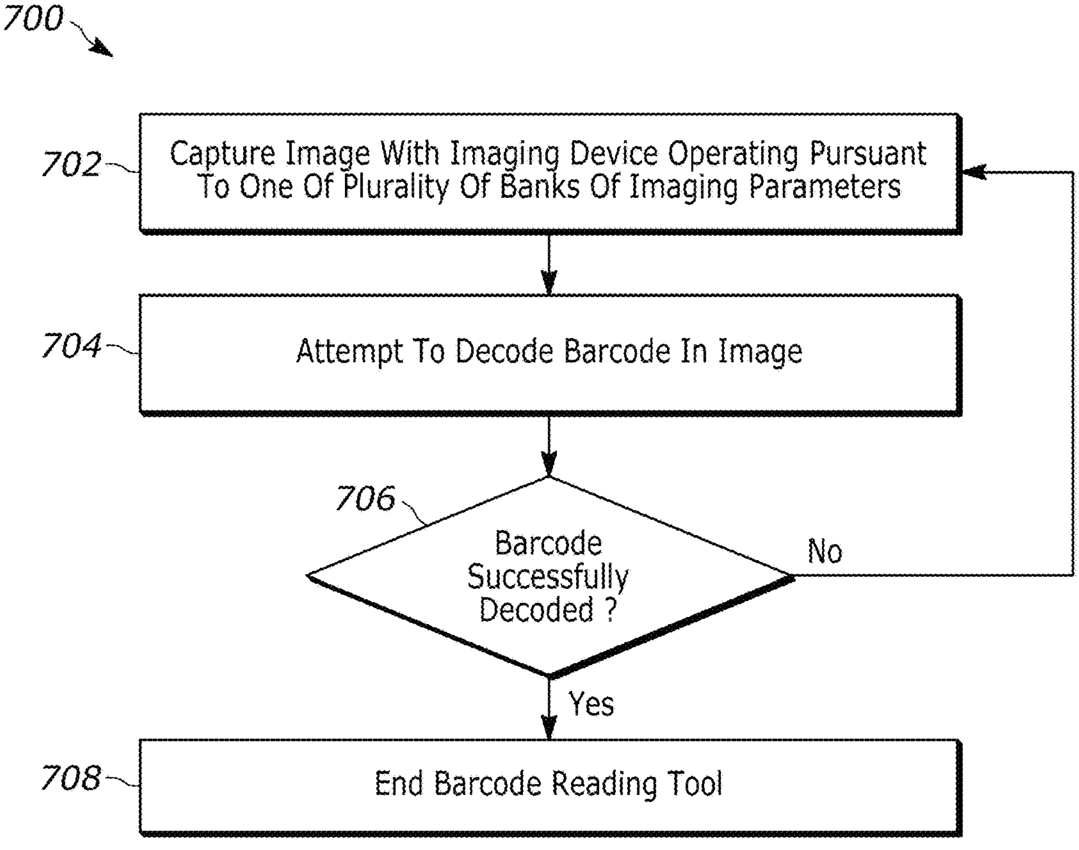
FIG. 7 depicts a flow diagram of an example method as may be implemented by the system of FIG. 1, for executing a machine vision job on an imaging device, in which an image is captured pursuant to one of a plurality of banks of imaging parameters, an attempt is made to decode a barcode in the image, and if no barcode is decoded, this process is repeated by capturing a new image pursuant to another one of the plurality of banks of imaging parameters, until a barcode is decoded, in accordance with embodiments described herein.
Figure 8:
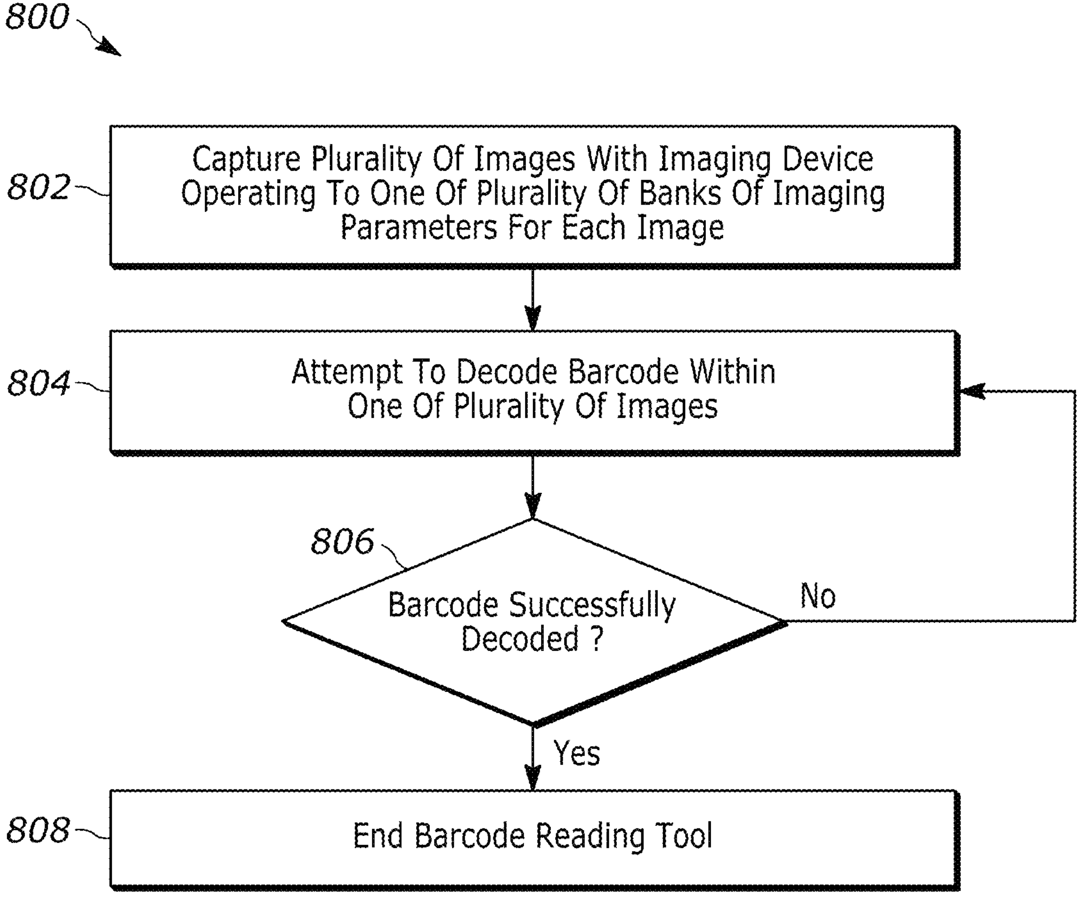
FIG. 8 depicts a flow diagram of an example method as may be implemented by the system of FIG. 1, for executing a machine vision job on an imaging device, in which a plurality of images are captured pursuant to one of a plurality of banks of imaging parameters for each image, an attempt is made to decode a barcode in one of the plurality of images, and if no barcode is decoded, this process is repeated with another one of the plurality of images, until a barcode is decoded, in accordance with embodiments described herein.
Figure 9:
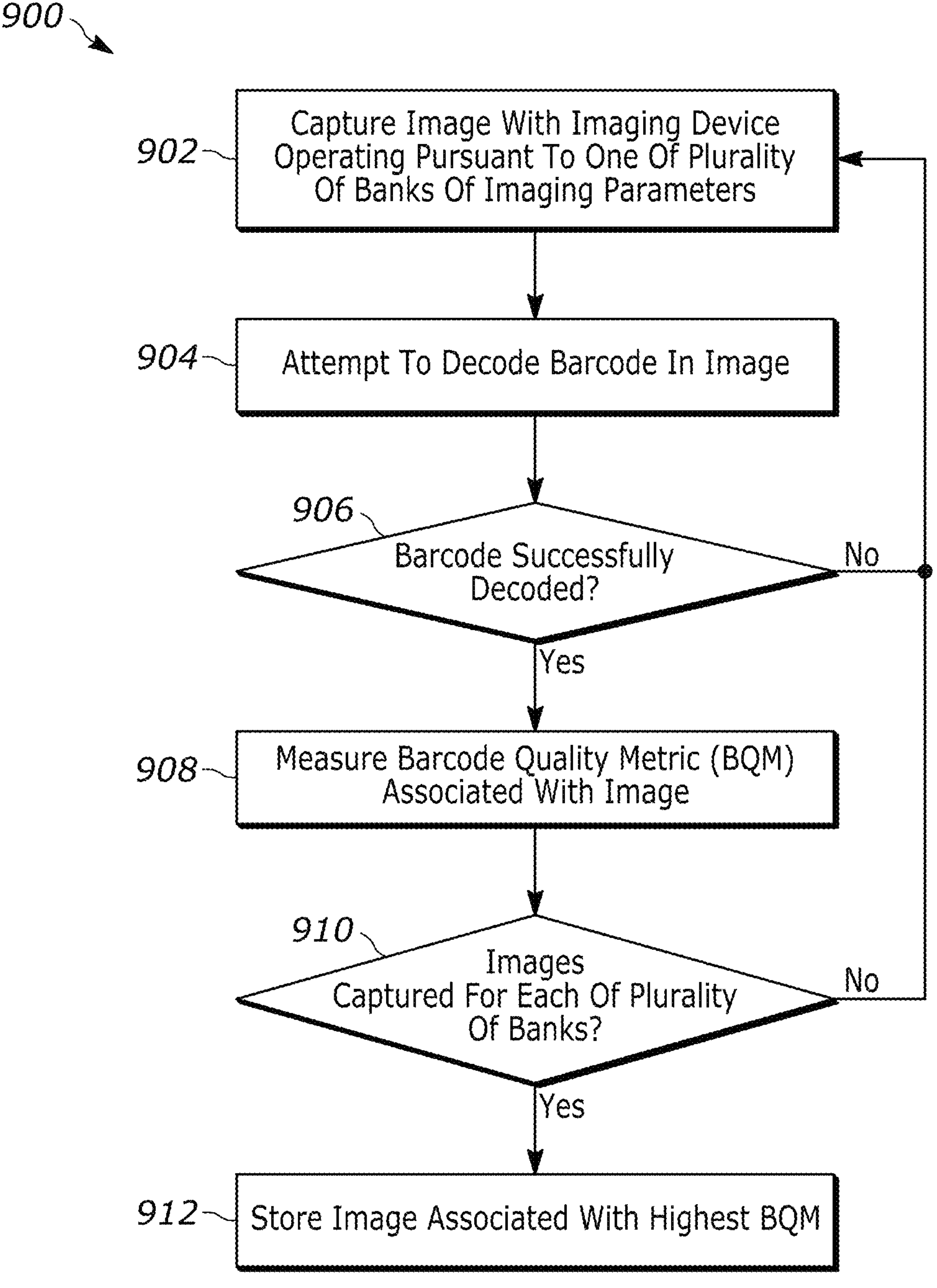
FIG. 9 depicts a flow diagram of an example method as may be implemented by the system of FIG. 1, for executing a machine vision job on an imaging device, in which an image is captured pursuant to one of a plurality of banks of imaging parameters, an attempt is made to decode a barcode in the image, and this process is repeated by capturing images pursuant to each of the plurality of banks of imaging parameters, with a barcode quality metric (BQM) of each successfully decoded barcode measured, and the image associated with the highest measured BQM is stored, in accordance with embodiments described herein.
Figure 10:
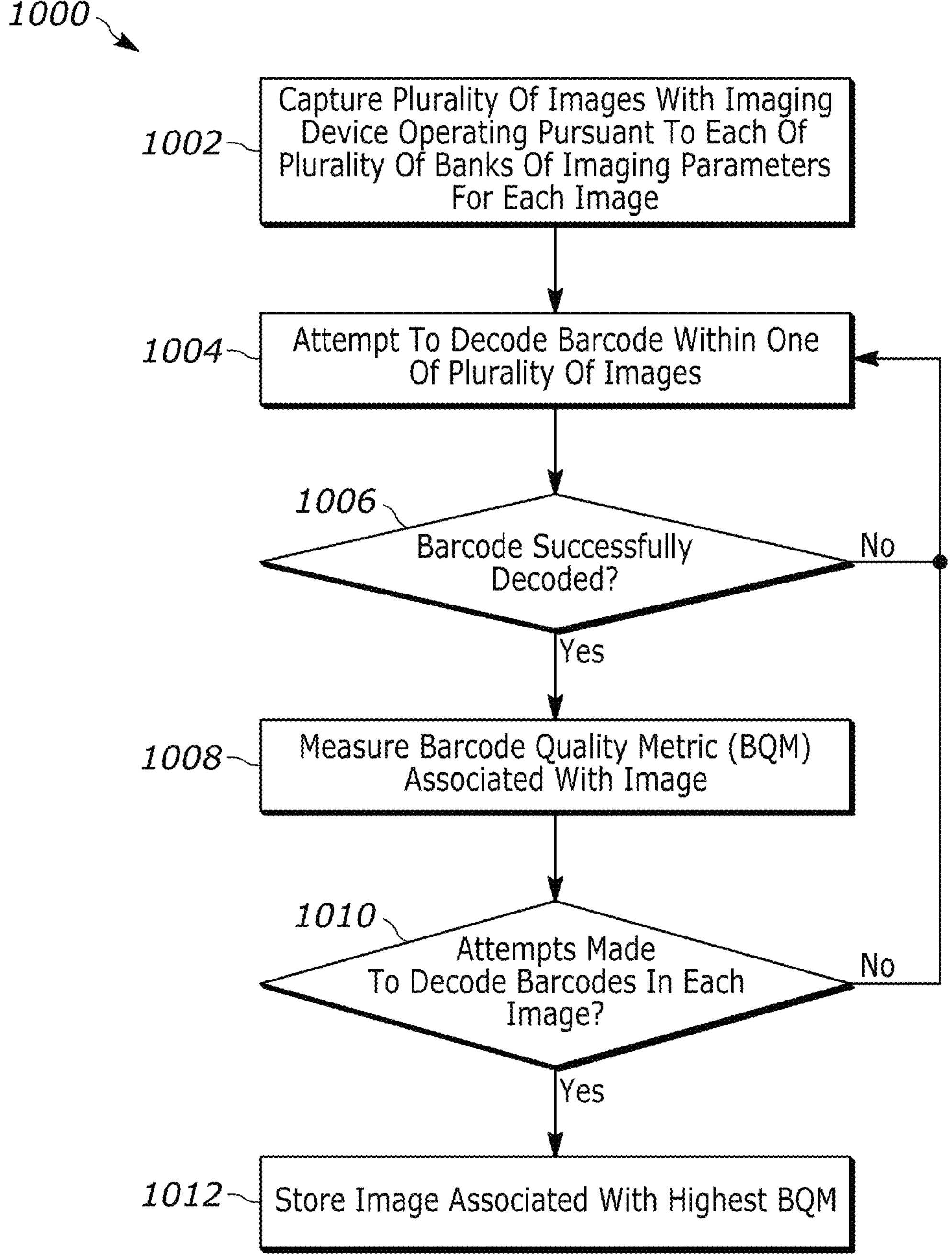
FIG. 10 depicts a flow diagram of an example method as may be implemented by the system of FIG. 1, for executing a machine vision job on an imaging device, in which a plurality of images are captured pursuant to one of a plurality of banks of imaging parameters for each image, an attempt is made to decode a barcode in each of the plurality of images, with a barcode quality metric (BQM) of each successfully decoded barcode measured, and the image associated with the highest measured BQM is stored, in accordance with embodiments described herein.

Referring now to FIG. 1, an example imaging system 100 configured to analyze pixel data of an image of a target object to execute a machine vision job is illustrated, in accordance with various embodiments disclosed herein. In the example embodiment of FIG. 1, the imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description, such as the method 600 as shown at FIG. 6, the method 700 as shown at FIG. 7, the method 800 as shown at FIG. 8, the method 900 as shown at FIG. 9, and/or the method 1000 as shown at FIG. 10. The user computing device 102 is generally configured to enable a user/operator to create a machine vision job for execution on the imaging device 104. When created, the user/operator may then transmit/upload the machine vision job to the imaging device 104 via the network 106, where the machine vision job is then interpreted and executed. The user computing device 102 may comprise one or more operator workstations, and may include one or more processors 108, one or more memories 110, a networking interface 112, an input/output (I/O) interface 114, and a smart imaging application 116.

The imaging device 104 is connected to the user computing device 102 via a network 106, and is configured to interpret and execute machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, an I/O interface 124, and an imaging assembly 126. The imaging assembly 126 may include a digital camera and/or digital video camera for capturing or taking digital images and/or frames. Each digital image may comprise pixel data that may be analyzed by one or more tools each configured to perform an image analysis task. The digital camera and/or digital video camera of, e.g., the imaging assembly 126 may be configured, as disclosed herein, to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the smart imaging application 116, which may be configured to enable machine vision job construction, as described further herein. Additionally, or alternatively, the smart imaging application 116 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein, e.g., such as the method 600 as shown at FIG. 6, the method 700 as shown at FIG. 7, the method 800 as shown at FIG. 8, the method 900 as shown at FIG. 9, and/or the method 1000 as shown at FIG. 10.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to construct jobs, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
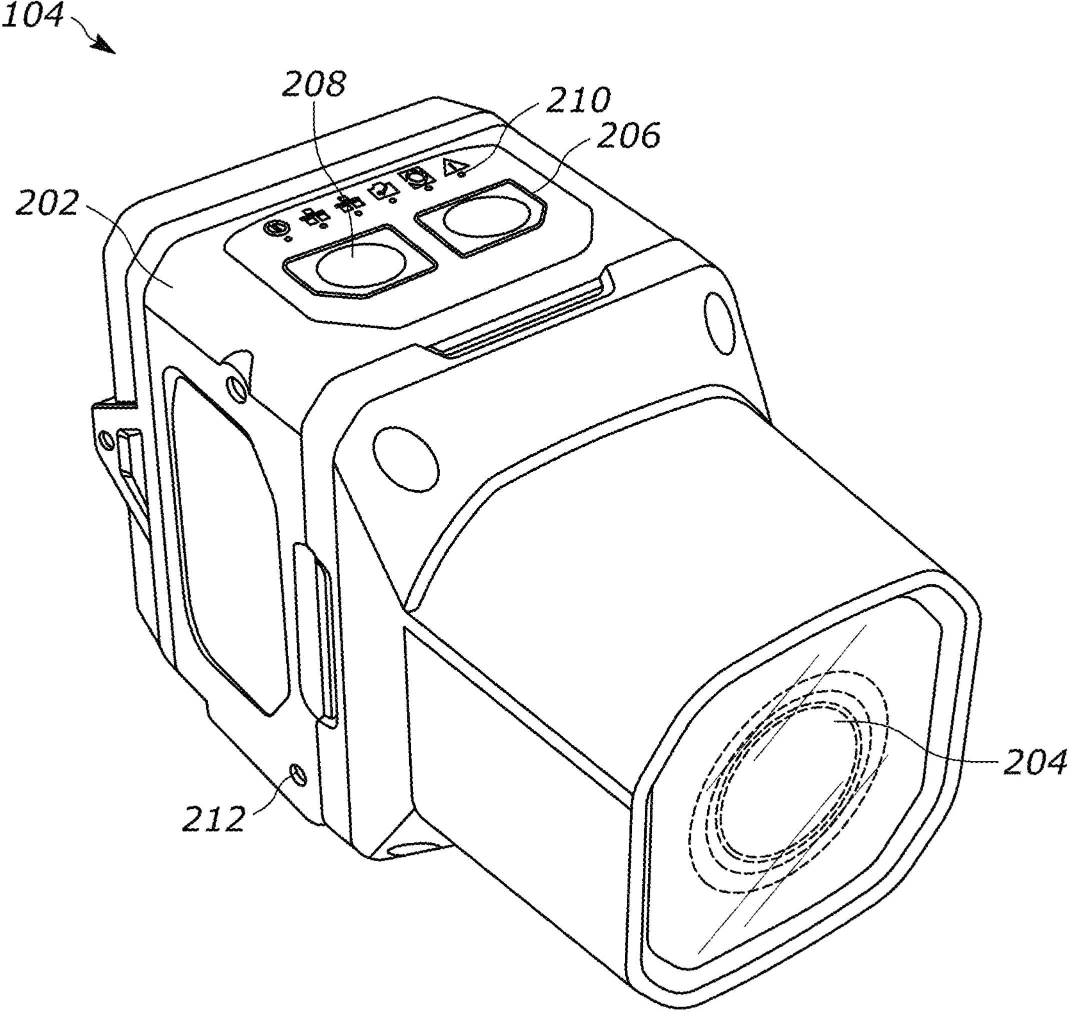
FIG. 2 is a perspective view of the imaging device of FIG. 1, in accordance with embodiments described herein.

FIG. 2 is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120) for use in later developed machine vision jobs, as discussed herein.

To further this example, and as discussed further herein, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 3:
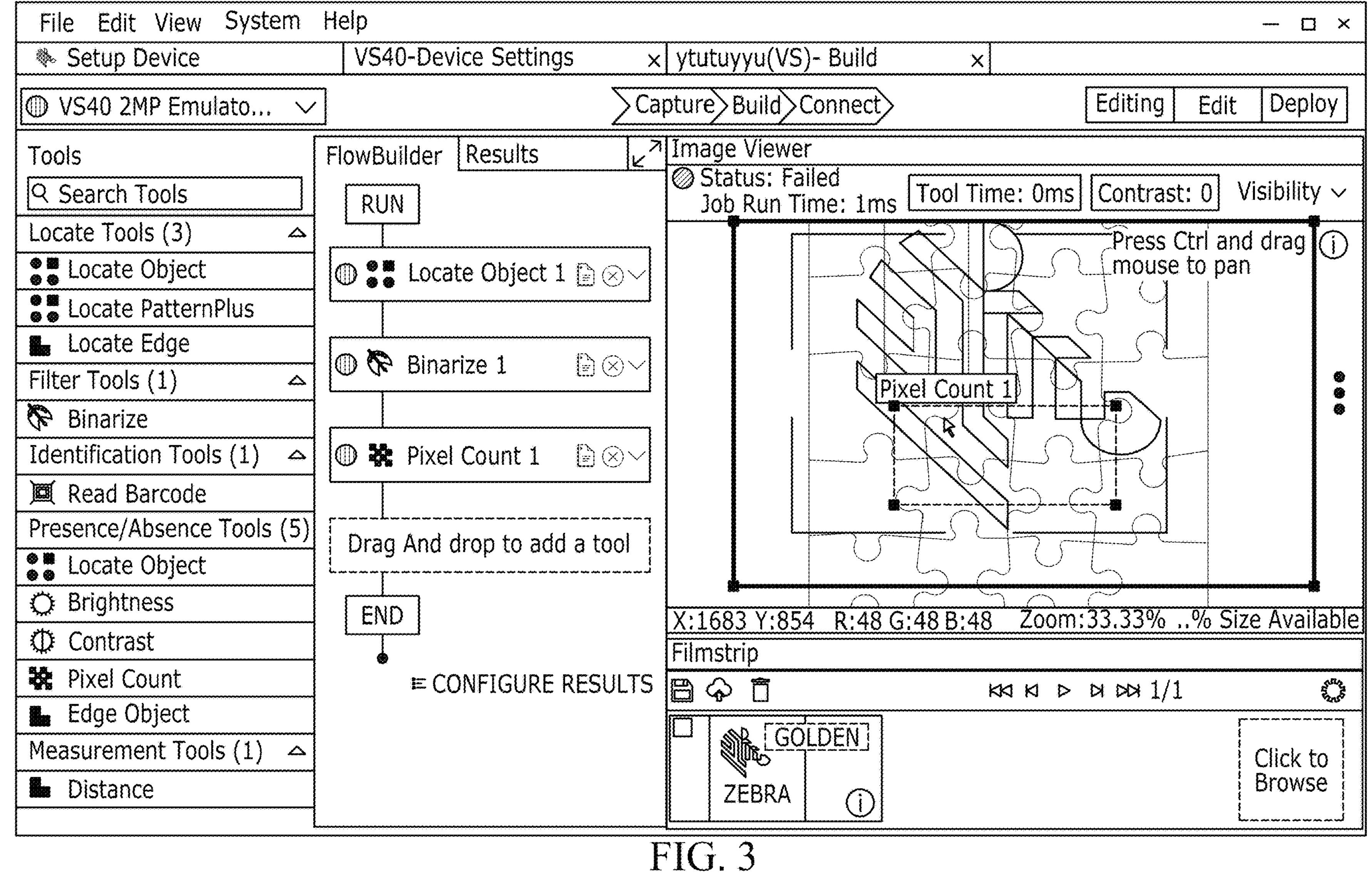
FIG. 3 depicts an example application interface utilized to optimize one or more jobs, in accordance with embodiments described herein.

FIG. 3 depicts an example application interface 300 utilized to optimize one or more jobs in accordance with embodiments described herein. Generally, the example application interface 300 may represent an interface of a smart imaging application (e.g., smart imaging application 116) a user may access via a user computing device (e.g., user computing device 102). Specifically, the example application interface 300 may present a user with a series of menus to create a new job or edit a current job. In creating a new job, the user is able to select from a variety of tools which form a particular job. Such tools may include, but are not limited to, (i) a barcode scanning/reading tool, (ii) a pattern matching tool, (iii) an edge detection tool, (iv) a semantic segmentation tool, (v) an object detection tool, and/or (vi) an object tracking tool.

Referring to the barcode decode tool, it has been recognized that, relatively speaking, a barcode decode operation is one of the faster operations that may be performed by the imaging device 104. As such, when configuring a job, and more specifically, the parameters of the barcode decode tool, the example application interface 300 has been configured to provide options for selecting a plurality of banks for this tool. As used herein, a bank refers to a set of imaging parameters that associated with imaging device 104. Such imaging parameters include, but are not limited to, gain, exposure, focal distance, f number, illumination intensity, illumination color, illumination source, digital filter, etc. Typically, once a tool has been configured with a specific bank, upon the execution of that tool the imaging device 104 will operate pursuant to the parameters set forth in the specific bank.

Figure 4:
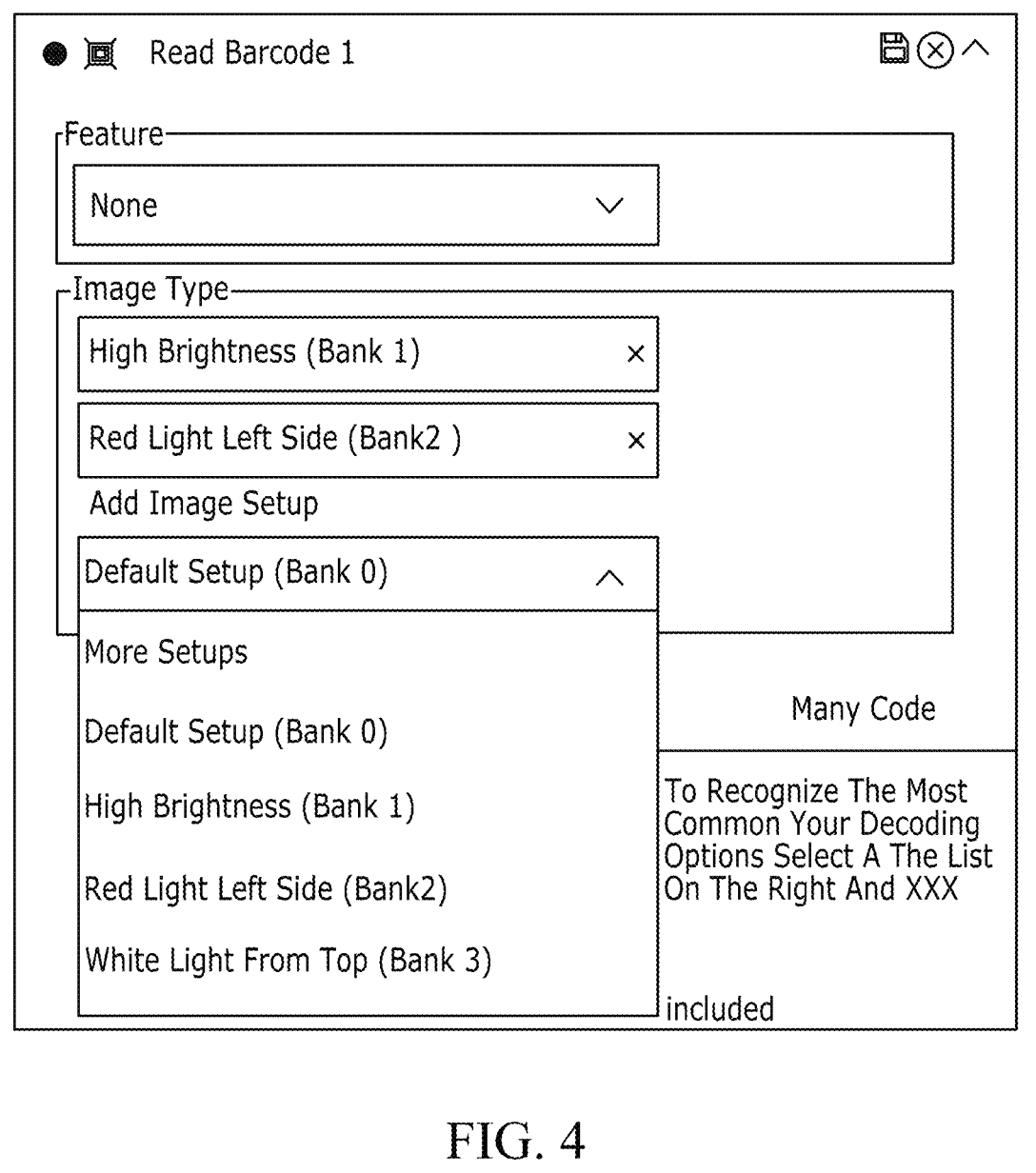

Referring to FIG. 4, shown therein is an example of the barcode decode tool being configured as part of a job. The tool provides two or more menus (in this case drop-down menus) for selecting a preferred bank for the operation of the imaging device during the execution of the job. Each bank may be pre-configured at a different stage of configuration of the job and/or may be a separate function not associated with any particular job at all. In other words, a user may have an option to create and/or edit any number of banks within some portion of the example application interface 300 such that each of those banks will be available for selection at a later time when a job is being created or edited. In some embodiments, a creation and/or editing of banks may be done as part of creating and/editing a particular job. Also, in some embodiments, each menu may provide an option to create or edit a bank from within the menu.

In preferred embodiments, the bank selected for each menu will differ from every other bank selected for every other menu. This is illustrated in FIG. 4 where the first selected bank is "High Brightness (Bank 1)," the second selected bank is "Red Light Left Side (Bank 2)," and the third bank that is in the process of being selected is "Default Setup (Bank 0)."

Upon a creation of a barcode decode tool with multiple banks and a subsequent creation of a complete job, the execution of the job may result in improved image processing, leading improved performance of the overall vision system. This can be attributed, at least in part, to the specific execution of a job having a barcode decode tool programmed as described herein.

More specifically, upon the execution of a job having a barcode decode tool programmed in a manner described above, the imaging device 104 will be configured to capture a burst of images when executing the barcode decode tool. This burst of image captures corresponds to the banks that were selected during the barcode decode tool configuration stage. Thus, for every bank specified in the barcode decode tool, the imaging device 104 is configured to capture an image using the parameters specified in the respective bank. If, for example, three banks have been specified, as in FIG. 4, during the execution of a job, and more specifically, during the execution of the barcode decode operation, the imaging device 104 may: capture a first image with the parameters configured in a manner that is specified in the "High Brightness (Bank 1)," capture a second image with the parameters configured in a manner that is specified in the "Red Light Left Side (Bank 2)," and capture a third image with the parameters configured in a manner that is specified in the "Default Setup (Bank 0)."

It should be appreciated that while the aforementioned approach may result in the imaging device 104 capturing all three images, this may not be necessary for a successful execution of the barcode decode tool. In a preferred embodiment, subsequent to capturing each image, image data associated with said image is transmitted to a decode module (preferably located within the imaging device 104) for an attempted decode. If a decode is successful, the execution of the barcode decode tool is terminated successfully and the job proceeds to the execution of a subsequent tool. If, however, a decode is not successful, the imaging device proceeds to capture a subsequent image from within the burst with that image being captured pursuant to the subsequent bank parameters and this image is again sent to the decode module. Such scheme is repeated until a successful decode is obtained or until all banks have been exhausted (at which point the execution of the barcode decode tool is terminated unsuccessfully).

In an alternate embodiment, the configuration of the job as described above may result in the imaging device 104 capturing all burst images prior to transmitting any one of them to the decode module.

Figure 5:
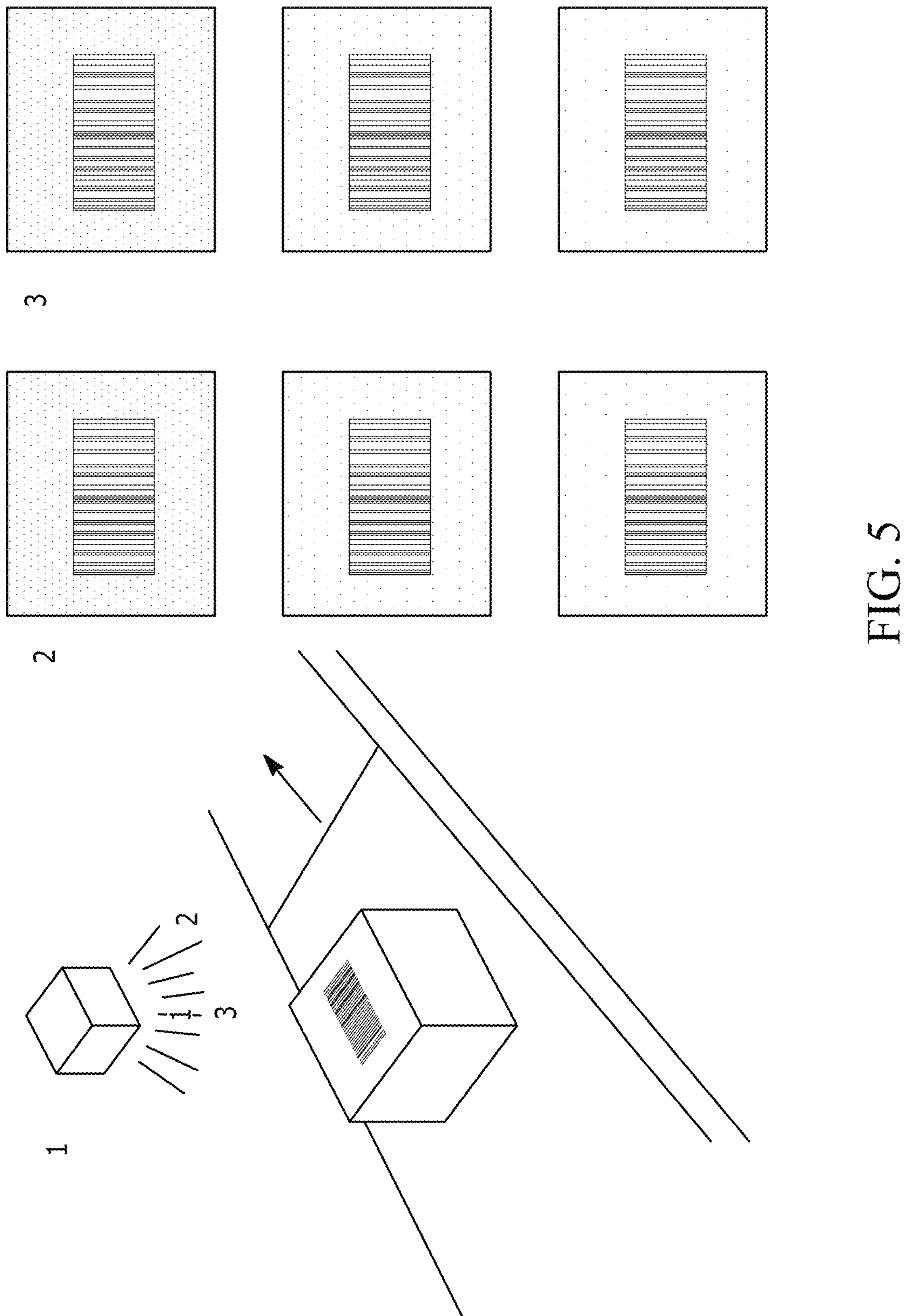
FIG. 5 depicts an example operating environment for an imaging system disclosed herein with an item passing within the view of an imaging device.

A particular advantage of the approach described above stems from a recognition that a barcode decode operation can be executed considerably faster relative to some other operations like, for example, object dimensioning. As a result, introducing a burst of image captures into a job results in a relatively small increase in the time that it takes to perform said job. In other words, if, as shown in FIG. 5, a box is moving on a conveyor belt past a field of view of an imaging device, introducing an image capture burst associated with a barcode decode operation likely does not introduce a significant-enough of a delay such that the box will be out of the FOV by the time that subsequent tools of the job are set to execute. Thus, if an example job includes a barcode read operation and a dimensioning operation, and if no other time-consuming operations may be performed due to the speed at which the box is moving past the imaging device, executing an image capture burst for the barcode read operation is not likely to effect the ability to execute the subsequent dimensioning job as the time occupied by capturing and trying to decode the second and third images forms a minute part of the time that the box remains within the FOV of the imaging device.

It should be appreciated that while the aforementioned approach has been described with respect to the barcode decode tool, it may also apply to any other tool that is being configured as part of a job. Its effectiveness, however, likely depends on the relative speed of execution of a particular tool that it is being applied to. For instance, if a tool takes ~1 second to execute and it is envisioned that a target will remain within the FOV of the imaging device for no more than 2 seconds, it is unfeasible to implement a multi-bank approach under such a tool since it would prevent any other tools which require their own image capture from being executed. On the other hand, if a tool takes ~0.01 seconds to execute, executing the tool with a multi-bank approach is not likely to affect other tools that need to execute within the 2-second span.

In some embodiments it is preferred that the barcode reader tool is executed prior to other tools.

FIG. 6 depicts a flow diagram of an example method 600 as may be implemented by the system 100 of FIG. 1, for optimizing one or more imaging settings for a machine vision job. One or more steps of the method 600 may be implemented as a set of instructions stored on a computer-readable memory (e.g., memory 110 and/or 120) and executable on one or more processors (e.g., processors 108 and/or 118), an imaging device communicatively coupled to the computing device At block 602, a machine vision job may be configured by an application executing on a computing device (such as smart imaging application 116 executing on the user computing device 102). Configuring the machine vision job may include configuring a barcode reading tool, which may include setting a plurality of banks of imaging parameters. These imaging parameters may include at least one of: a lighting parameter, an exposure parameters, or a focus parameter. Each of the plurality of banks of imaging parameters may be different from each other of the plurality of banks of imaging parameters. Various number of banks of imaging parameters may be set in various embodiments. For example, in some embodiments, three or more banks of imaging parameters may be set for the barcode reading tool. For instance, a first bank of imaging parameters may include a first lighting parameter, a first exposure parameter, and a first focus parameter; a second bank of imaging parameters may include a second lighting parameter, a second exposure parameter, and a second focus parameter; and a third bank of imaging parameters may include a third lighting parameter, a third exposure parameter, and a third focus parameter.

Additionally, in some examples, the machine vision job may include one or more other tools, i.e., in addition to the barcode reading tool. Configuring one or more of the other tools may include setting only a single bank of imaging parameters for the tool.

At block 604, the machine vision job may be transmitted from the computing device to an imaging device communicatively coupled to the computing device (e.g., transmitted from the computing device 102 to the imaging device 104).

At block 606, the machine vision job, including the barcode reading tool, may be executed on the imaging device. For instance, the imaging device may be stationary, and a barcode may appears on a target moving past the imaging device at a substantially constant speed. In some examples, the machine vision job, including the barcode reading tool, may be performed for each of a plurality of targets (and respective barcodes) appearing within a field of view of the imaging device.

During an execution of the barcode reading tool, the machine vision job may cause the imaging device to proceed to the method 700, as shown at FIG. 7, to the method 800, as shown at FIG. 8, to the method 900, as shown at FIG. 9, or to the method 1000, as shown at FIG. 10, in various embodiments.

FIG. 7 depicts a flow diagram of an example method 700 as may be implemented by the system 100 of FIG. 1, for executing a machine vision job on an imaging device. One or more steps of the method 700 may be implemented as a set of instructions stored on a computer-readable memory (e.g., memory 110 and/or 120) and executable on one or more processors (e.g., processors 108 and/or 118).

At block 702, an image may be captured by an imaging device (e.g., the imaging device 104) operating pursuant to one of the plurality of banks of imaging parameters.

At block 704, an attempt may be made (e.g., by the imaging device 104) to decode a barcode within the image captured at block 702.

At block 706, a determination may be made as to whether the barcode within the image was successfully decoded. If the barcode within the image is successfully decoded (block 706, YES) the barcode reading tool may be successfully ended at block 708. In some examples, successfully decoding the barcode within the image includes decoding the barcode with a barcode quality metric (BQM) greater than a threshold BQM. That is, in such examples, the barcode reading tool may be successfully ended only upon decoding a barcode with a barcode quality metric greater than the threshold BQM.

If the barcode within the image is not successfully decoded (block 706, NO), block 702 may be repeated by capturing a new image by the imaging device operating pursuant to another one of the plurality of banks of imaging parameters, and blocks 704 and 706 may be repeated with the new image. This may be repeated until a barcode is decoded in one of the images (block 706, YES), and the barcode reading tool is successfully ended at block 708. In some examples, unsuccessfully decoding the barcode within the image includes decoding the barcode with a BQM below the threshold BQM. That is, in such examples, block 702 may be repeated by capturing a new image and repeating blocks 704 and 706 until a barcode is decoded with a barcode quality metric greater than the threshold BQM.

In some examples, the method 700 may further include, responsive to successfully decoding a barcode within an image (block 706, YES), storing an indication of the particular bank of imaging parameters, of the plurality of banks of imaging parameters that was used when the image was captured. The method 700 may further include capturing subsequent images (i.e., when repeating block 702 for a new machine vision job) with the imaging device initially operating pursuant to the stored bank of imaging parameters, before proceeding to other banks of imaging parameters as needed. Advantageously, by operating in this manner, the method 700 may become more efficient for subsequent machine vision jobs by starting with the imaging device capturing images operating pursuant to the bank of imaging parameters that led to successful barcode decoding in previous machine vision jobs.

FIG. 8 depicts a flow diagram of an example method 800 as may be implemented by the system 100 of FIG. 1, for executing a machine vision job on an imaging device. One or more steps of the method 800 may be implemented as a set of instructions stored on a computer-readable memory (e.g., memory 110 and/or 120) and executable on one or more processors (e.g., processors 108 and/or 118).

At block 802, a plurality of images may be captured by an imaging device (e.g., the imaging device 104) operating pursuant to one of the plurality of banks of imaging parameters for each image. That is, each image of the plurality of images may be captured using a different one of the plurality of banks of imaging parameters.

At block 804, an attempt may be made (e.g., by the imaging device 104) to decode a barcode within one of the plurality of images captured at block 802.

At block 806, a determination may be made as to whether the barcode within the image was successfully decoded. If the barcode within the image is successfully decoded (block 806, YES), the barcode reading tool may be successfully ended at block 808. In some examples, successfully decoding the barcode within the image includes decoding the barcode with a barcode quality metric (BQM) greater than a threshold BQM. That is, in such examples, the barcode reading tool may be successfully ended only upon decoding a barcode with a barcode quality metric greater than the threshold BQM.

If the barcode within the image is not successfully decoded (block 806, NO), block 804 may be repeated by attempting to decode a barcode within another one of the plurality of images captured at block 802, and block 806 may be repeated within the new image. This may be repeated until a barcode is decoded in one of the plurality of images captured at block 802 (block 806, YES), and the barcode reading tool successfully ended at block 808. In some examples, unsuccessfully decoding the barcode within the image includes decoding the barcode with a BQM below the threshold BQM. That is, in such examples, block 804 may be repeated by attempting to decode a barcode within another one of the plurality of images captured at block 802, and block 806 may be repeated within the new image until a barcode is decoded with a barcode quality metric greater than the threshold BQM.

In some examples, the method 800 may further include, responsive to successfully decoding a barcode within an image (block 806, YES), storing an indication of the particular bank of imaging parameters, of the plurality of banks of imaging parameters that was used when the image was captured. The method 800 may further include first attempting to decode a barcode (i.e., when repeating block 804 for a new machine vision job) within an image that was captured with the imaging device operating pursuant to the stored bank of imaging parameters, before proceeding to attempting to decode barcodes in the images captured using the other banks of imaging parameters as needed. Advantageously, by operating in this manner, the method 800 may become more efficient for subsequent machine vision jobs by starting by attempting to decode images captured using the bank of imaging parameters that led to successful barcode decoding in previous machine vision jobs.

FIG. 9 depicts a flow diagram of an example method 900 as may be implemented by the system 100 of FIG. 1, for executing a machine vision job on an imaging device. One or more steps of the method 700 may be implemented as a set of instructions stored on a computer-readable memory (e.g., memory 110 and/or 120) and executable on one or more processors (e.g., processors 108 and/or 118).

At block 902, an image may be captured by an imaging device (e.g., the imaging device 104) operating pursuant to one of the plurality of banks of imaging parameters.

At block 904, an attempt may be made (e.g., by the imaging device 104) to decode a barcode within the image captured at block 702.

At block 906, a determination may be made as to whether the barcode within the image was successfully decoded. If the barcode within the image is successfully decoded (block 906, YES) a barcode quality metric (BQM) associated with the image may be measured at block 908.

If the barcode within the image is not successfully decoded (block 906, NO), block 902 may be repeated by capturing a new image by the imaging device operating pursuant to another one of the plurality of banks of imaging parameters, and blocks 904, 906, and 908 may be repeated with the new image. This may be repeated (block 910, NO), until blocks 902-908 are performed for at least image is captured by the imaging device operating pursuant to each of the plurality of banks of imaging parameters (block 910, YES). That is, blocks 902-908 may be performed for at least one image captured by the imaging device for each of the banks of imaging parameters, at which point the method 900 may proceed to block 912, where the image associated with the highest BQM is stored. That is, the BQMs for each image in which a barcode is successfully decoded may be compared, and the image associated with the highest BQM may be stored.

In some examples, the method 900 may further include, responsive to storing an image associated with the highest BQM at block 912, storing an indication of the particular bank of imaging parameters, of the plurality of banks of imaging parameters that was used when the image was captured. The method 900 may further include capturing subsequent images (i.e., when repeating block 902 for a new machine vision job) with the imaging device initially operating pursuant to the stored bank of imaging parameters, before proceeding to other banks of imaging parameters as needed. Advantageously, by operating in this manner, the method 900 may become more efficient for subsequent machine vision jobs by starting with the imaging device capturing images operating pursuant to the bank of imaging parameters that led to the highest BQM measurement in previous machine vision jobs.

FIG. 10 depicts a flow diagram of an example method 1000 as may be implemented by the system 100 of FIG. 1, for executing a machine vision job on an imaging device. One or more steps of the method 800 may be implemented as a set of instructions stored on a computer-readable memory (e.g., memory 110 and/or 120) and executable on one or more processors (e.g., processors 108 and/or 118).

At block 1002, a plurality of images may be captured by an imaging device (e.g., the imaging device 104) operating pursuant to one of the plurality of banks of imaging parameters for each image. That is, each image of the plurality of images may be captured using a different one of the plurality of banks of imaging parameters. That is, at least one image may be captured using each of the plurality of banks of imaging parameters.

At block 1004, an attempt may be made (e.g., by the imaging device 104) to decode a barcode within one of the plurality of images captured at block 1002.

At block 1006, a determination may be made as to whether the barcode within the image was successfully decoded. If the barcode within the image is not successfully decoded (block 1006, NO), block 1004 may be repeated by attempting to decode a barcode within another one of the plurality of images captured at block 1002, and block 1006 may be repeated within the new image. This may be repeated until a barcode is decoded in one of the plurality of images captured at block 1002 (block 806, YES). Each time a barcode within an image is successfully decoded (block 1006, YES), a barcode quality metric (BQM) associated with the image may be measured (block 1008). Blocks 1004, 1006, and 1008 may be repeated (block 1010, NO) until attempts have been made to decode barcodes in each of the images captured at block 1002, and respective BQMs for each successfully decoded barcode are measured (block 1010, YES), at which point the method 1000 may proceed to block 1012, where the image associated with the highest BQM is stored. That is, the BQMs for each image in which a barcode is successfully decoded may be compared, and the image associated with the highest BQM may be stored.

In some examples, the method 1000 may further include, responsive to storing an image associated with the highest BQM at block 1012, storing an indication of the particular bank of imaging parameters, of the plurality of banks of imaging parameters that was used when the image was captured. The method 1000 may further include first attempting to decode a barcode (i.e., when repeating block 1004 for a new machine vision job) within an image that was captured with the imaging device operating pursuant to the stored bank of imaging parameters, before proceeding to attempting to decode barcodes in the images captured using the other banks of imaging parameters as needed. Advantageously, by operating in this manner, the method 1000 may become more efficient for subsequent machine vision jobs by starting by attempting to decode images captured using the bank of imaging parameters that led to the highest BQMs in previous machine vision jobs.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for operating a fixed industrial scanner system, the fixed industrial scanner system including a computing device executing an application and an imaging device communicatively coupled to the computing device, the method comprising:

configuring, via the application, a machine vision job, the configuring the machine vision job including configuring a barcode reading tool, the configuring the barcode reading tool including setting a plurality of banks of imaging parameters, each of the plurality of banks of imaging parameters being different from each other of the plurality of banks of imaging parameters;

transmitting, from the computing device to the imaging device, the machine vision job; and executing the machine vision job on the imaging device, wherein, during an execution of the barcode reading tool, the machine vision job causes the imaging device to:

(a) capture a plurality of images with the imaging device operating pursuant to one of the plurality of banks of imaging parameters for capturing each of the plurality of images;

(b) attempt to decode a barcode within one of the plurality of images;

(c) responsive to successfully decoding the barcode within the image, measure a barcode quality metric (BQM) associated with the decoded barcode;

(d) repeat (b)-(c) with another one of the plurality of images; and (e) store the image of the decoded barcode associated with the highest BQM.

2. The method of claim 1, wherein the executing the machine vision job on the imaging device is performed for each target appearing within a field of view of the imaging device.

3. The method of claim 1, wherein the plurality of banks of imaging parameters includes three banks of imaging parameters.

4. The method of claim 1, wherein the imaging device is stationary and wherein the barcode appears on a target moving past the imaging device at a substantially constant speed.

5. The method of claim 1, wherein the machine vision job includes at least one other tool having only a single bank of imaging parameters.

6. The method of claim 1, wherein the imaging parameters include at least one of: a lighting parameter, an exposure parameter, and a focus parameter.

7. The method of claim 1, wherein executing the machine vision job on the imaging device further causes the imaging device to:

responsive to successfully decoding the barcode within the image, store an indication of the one of the plurality of banks of imaging parameters associated with successfully decoding the barcode within the image; and wherein executing a subsequent machine vision job on the imaging device causes the imaging device to first capture a subsequent image with the imaging device operating pursuant to the stored one of the plurality of banks of imaging parameters.

8. The method of claim 1, wherein successfully decoding the barcode within the image includes decoding the barcode with a BQM greater than a threshold BQM, and wherein unsuccessfully decoding the barcode within the image includes decoding the barcode with a BQM below the threshold BQM.

9. A fixed industrial scanner system comprising:

a computing device executing an application, the application operable to configure a machine vision job having a barcode reading tool, wherein the barcode reading tool includes a selection of a plurality of banks of imaging parameters, each of the plurality of banks of imaging parameters being different from each other of the plurality of banks of imaging parameters; and an imaging device configured to execute the machine vision job such that the, during an execution of the barcode reading tool, the machine vision job causes the imaging device to:

(a) capture a plurality of images with the imaging device operating pursuant to one of the plurality of banks of imaging parameters for capturing each of the plurality of images;

(b) attempt to decode a barcode within one of the plurality of images;

(c) responsive to successfully decoding the barcode within the image, measure a barcode quality metric (BQM) associated with the decoded barcode;

(d) repeat (b)-(c) with another one of the plurality of images; and (e) store the image of the decoded barcode associated with the highest BQM.

10. The fixed industrial scanner system of claim 9, wherein the executing the machine vision job on the imaging device is performed for each target appearing within a field of view of the imaging device.

11. The fixed industrial scanner system of claim 9, wherein the plurality of banks of imaging parameters includes three banks of imaging parameters.

12. The fixed industrial scanner system of claim 9, wherein the imaging device is stationary and wherein the barcode appears on a target moving past the imaging device at a substantially constant speed.

13. The fixed industrial scanner system of claim 9, wherein the machine vision job includes at least one other tool having only a single bank of imaging parameters.

14. The fixed industrial scanner system of claim 9, wherein the imaging parameters include at least one of: a lighting parameter, an exposure parameter, and a focus parameter.

15. The fixed industrial scanner system of claim 9, wherein executing the machine vision job further causes the imaging device to:

responsive to successfully decoding the barcode within one of the plurality of images, store an indication of the one of the plurality of banks of imaging parameters associated with successfully decoding the barcode within the image; and wherein executing a subsequent machine vision job on the imaging device causes the imaging device to first attempt to decode a barcode in a subsequent image captured by the imaging device operating pursuant to the stored one of the plurality of banks of imaging parameters.

16. The fixed industrial scanner system of claim 9, wherein successfully decoding the barcode within one of the plurality of images includes decoding the barcode within one of the plurality of images with a BQM greater than a threshold BQM, and wherein unsuccessfully decoding the barcode within the within one of the plurality of images includes decoding the barcode within one of the plurality of images with a BQM below the threshold BQM.

17. A fixed industrial scanner system comprising:

a computing device operable to configure a machine vision job with a plurality of banks of imaging parameters; and an imaging device configured to execute the machine vision job, such that the machine vision job causes the imaging device to:

(a) capture an image pursuant to one of the banks of imaging parameters;

(b) decode a barcode within the image;

(c) measure a barcode quality metric (BQM) associated with the decoded barcode;

(d) repeat (a)-(c) for each of the banks of imaging parameters; and (e) store the image of the decoded barcode associated with the highest BQM.

* * * * *